United States Patent [19]

Depouilly et al.

[11] 4,129,756
[45] Dec. 12, 1978

[54] TELEPHONE EXCHANGE SIGNALLING UNIT

[75] Inventors: Bernard M. H. Depouilly, Paris; Edouard M. J. A. I. Issenmann, Versailles, both of France

[73] Assignee: Le Material Telephonique, Boulogne-Billancourt, France

[21] Appl. No.: 834,874

[22] Filed: Sep. 20, 1977

[30] Foreign Application Priority Data

Sep. 24, 1976 [FR] France .................................. 76 28776

[51] Int. Cl.² ............................................ H04M 3/22
[52] U.S. Cl. ............................................ 179/175.2 R
[58] Field of Search .................. 179/175.3 R, 175.2 R, 179/15 BF, 18 FC, 18 B, 18 DA

[56] References Cited

U.S. PATENT DOCUMENTS

| 3,743,938 | 7/1973 | Davis ................................ 179/15 BF |
| 3,931,476 | 1/1976 | Matthews ....................... 179/18 AD |
| 3,985,972 | 10/1976 | Rolin et al. ..................... 179/18 DA |
| 4,002,847 | 1/1977 | Dail ................................ 179/15 BF |
| 4,039,751 | 8/1977 | Couturier et al. ............... 179/15 BF |

*Primary Examiner*—Douglas W. Olms
*Attorney, Agent, or Firm*—Roland Plottel

[57] ABSTRACT

A telephone exchange signalling unit is provided having looping means for feeding back and comparing transmitted data multiplets directly with its input data. This test is ordered by the control unit of the telephone exchange without the necessity of using wires other than the distribution and scan wires of the telephone exchange and the signalling unit.

7 Claims, 4 Drawing Figures

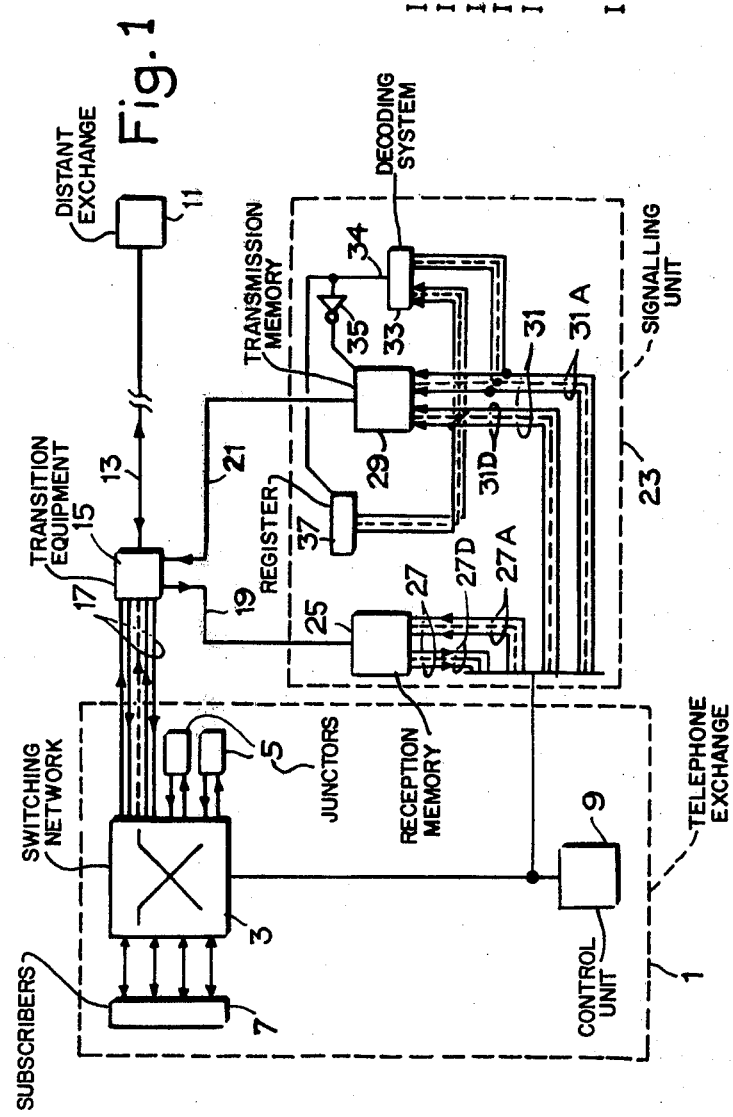
Fig. 1
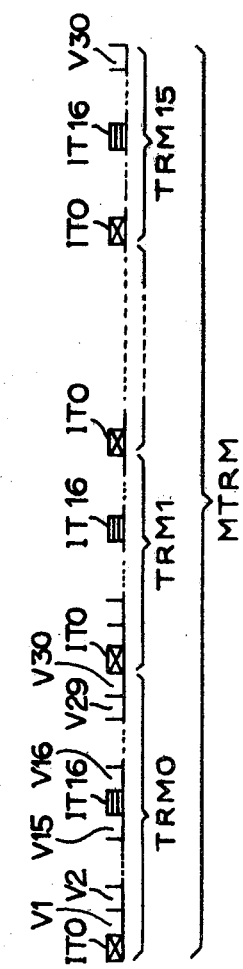
Fig. 3
Fig. 2

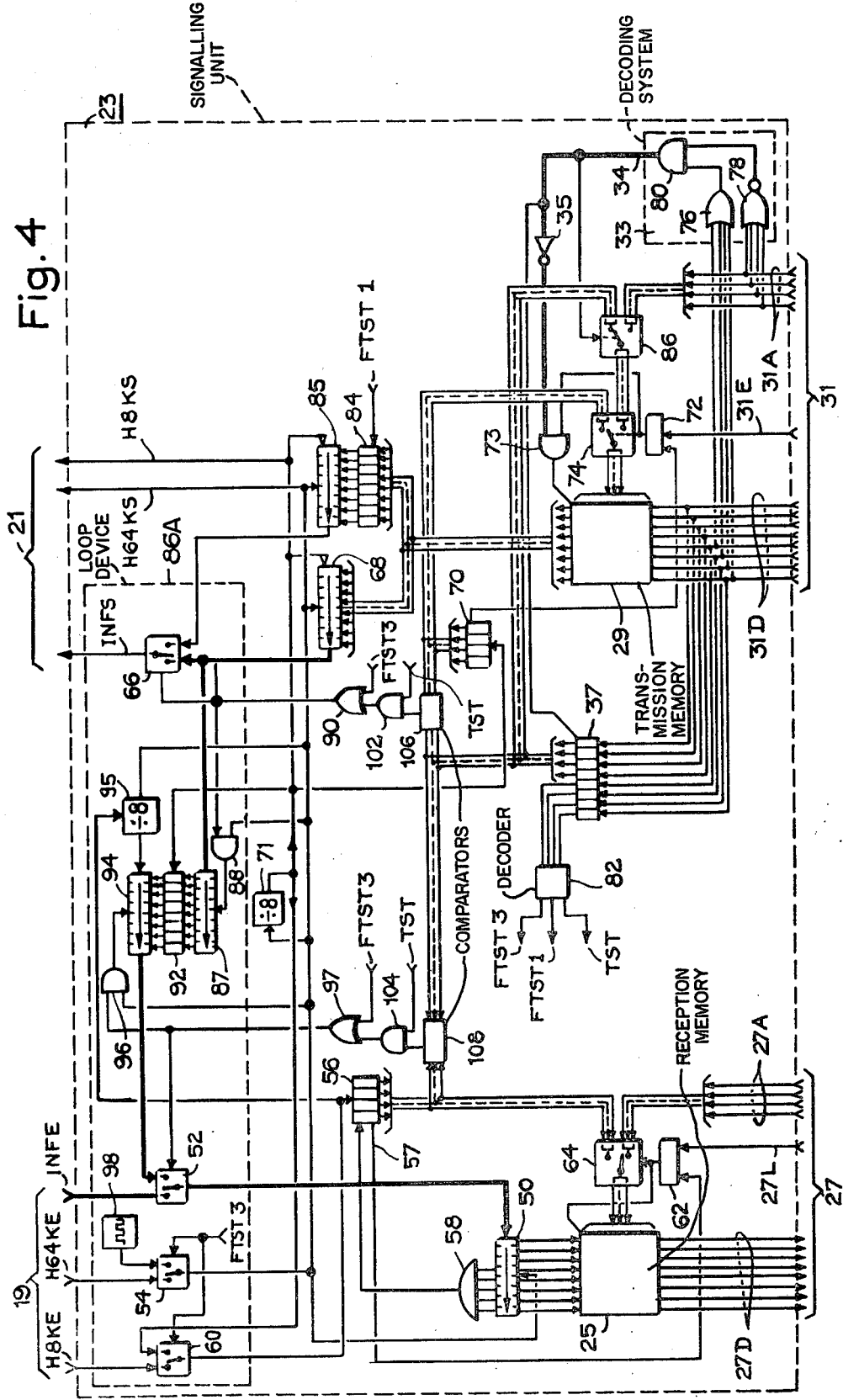

TELEPHONE EXCHANGE SIGNALLING UNIT

SUMMARY OF THE INVENTION

The present invention relates to a telephone exchange signalling unit for exchanging signalling data obtained from an encoded pulse signal junction, known as a PCM junction with a control unit. Such signals exist in the form of data multiplets arranged in frames at said PCM junction and are identified by a location code for the position of each signalling multiplet with respect to a synchronization multiplet. Said signalling unit comprises a reception memory for receiving storing the signalling multiplets obtained from the PCM junction and is capable of making them available on the scan wires of the control unit; a transmission memory for storing the signalling multiplets produced on the distribution wires by the control part; means for transmitting the data multiplets to the PCM junction, and means for comparing received and transmitted data.

In addition to the signalling data, other data can be transmitted from the control unit to the signalling unit. This is the case, for example, when checking the operation of this signalling unit, at which time testing orders are transmitted by the control unit to the signalling unit for performing certain tests. One of these tests consists of closing a loop, i.e. a connection between the transmission memory and the reception memory, such that the multiplets on the transmission memory output are recorded directly into the reception memory. If coincidence occurs between transmitted and received signals, the signalling unit is considered to be serviceable.

The present invention provides a signalling unit which can receive from the control unit additional data such as test orders without the necessity of wires distinct from the distribution and scan wires of the central unit and signalling unit.

For this purpose, a signalling unit in accordance with the invention is characterized whereby in order to receive data multiplets from the control unit, said data must first be screened by a decoding device whose first inputs are received from the distribution wires assigned to transmission of the signalling multiplets from the control unit to the transmission memory and whose second inputs are connected to the distribution wires assigned to transmission of the location codes. Such decoding device provides on its output and additional data signal for a location code representing the location of the synchronization multiplet.

The following description, together with the appended drawings, are provided as non-limiting examples which explain the principle and spirit of the invention.

DESCRIPTION OF THE DRAWINGS

FIG. 1 shows the signalling unit, according to the present invention cooperating with the telephone exchange to which it is attached.

FIG. 2 shows the organization of a channel multiframe on a junction for PCM signals useful within the context of the present invention.

FIG. 3 shows the distribution of the signalling multiplets with respect to the synchronization multiplet.

FIG. 4 describes a practical signalling unit.

DETAILED DESCRIPTION OF THE PREFERRED EMBODIMENT

In FIG. 1, reference 1 identifies a telephone exchange of a type described for example in the article "Centraux Locaux METACONTA L de capacité moyenne" (medium-capacity METACONTA L local exchanges) written by J. P. DARTOIS and published in the "Revue des Télécommunications", or "ITT Electrical Communication" No. 3, volume 4. This exchange possesses a switching network 3 which connects various junctors 5 to various subscribers 7. All switching operations are controlled by a control unit 9 consisting of two computors operation simultaneously and sharing the work load, as described in the article mentioned above.

Exchange 1 is connected to a distant exchange 11 by a junction 13 which is capable of receiving and transmitting pulse code modulation signals, i.e. a PCM junction. Since exchange 1 is designed for switching analogue signals, a transition equipment 15 is provided for feeding analogue signals to exchange 1 over the incoming wires 17 from the PCM signals of junction 13 and which also encodes the analogue signals available on the outgoing wires 17 into PCM signals. Seen by exchange 1, this equipment behaves as a junctor. In addition, this transition equipment 15 applies to a connection 19 the signals representing the signalling multiplets extracted from junction 13 and in the other direction inserts in this junction the signalling multiplets available on a connection 21.

Wires 19 and 21 connect the transition equipment 15 to the signalling unit 23. This signalling unit provides the interface between equipment 15 and the control unit 9. It possesses a reception memory 25 for recording the multiplets obtained over wire 19. This memory 25 is read by unit 9. Unit 9 applies to the scan wires 27A an address such that the multiplet contained in memory 25 at the location indicated by this address appears on the scan wires 27D.

The signalling units also posses a transmission memory 29. Unit 9 transmits over the distribution wires 31D to unit 23 signalling multiplets accompanied by a code whose signals are fed over wires 31A and which indicates the signalling multiplets are positioned in the signal frames at the PCM junction. These various frames constitute a multiframe whose organization is shown in FIG. 2. This multiframe MTRM in accordance with I.T.T.C.C. recommendations consists of 16 frames TRMO, TRM1, . . . , TRM15. Each frame is divided into 32 time intervals ITO, V1, V2, . . . , V15, IT16, V16, . . . ,V30. The time intervals V1, V2, . . . , V15, V16, . . . , V30 are assigned to the transmission of bytes representing speech data. Each interval defines a channel. Interval IT16 of frame TRMO possesses a first synchronization half-byte starting the multiframe. Intervals IT16 of frames TRM1 to TRM15 contain two half-bytes each relating to the signalling of one of the channels defined by the time intervalv V1 to V30. FIG. 3 shows how these signalling half-bytes are distributed amongst the different channels. In interval IT16 of frame TRM1, for example, are found two half-bytes SV1 and SV16 relative to the signalling of channels V1 and V16, whilst half-bytes SV2 and SV17 are found in IT16 of TRM2, and so on up to IT16 of frame TRM15, where the half-bytes SV15 and SV30 are found.

During the time interval IT16 of frame TRMO is found a first half-byte consisting of four "0" bits and a second half-byte whose second bit in particular can signal an alarm condition. The others are available for various uses. The code defining the location of this synchronization byte for the signalling is "0000", with the result that the various signalling bytes are given the codes "0001," "0010," etc.

In order to screen data multiplets from the control unit 9, the signalling unit according to the invention possesses a decoding system 33 (FIG. 1), whose first imputs are connected to the distribution wires 31D and whose second inputs are connected to wires 31A, while it produces on its output 34 an additional data signal for a location code representing the location of the synchronization multiplet, i.e. a code "0000," and for a multiplet whose first four bits are different from "0."

In FIG. 1, this signal applied via an inverter 35 inhibits recording of the byte present on wires 31D. On the other hand, it enables the recording of this byte in register 37. The data recorded in this manner can be used for different purposes. FIG. 4 shows how these data can be used for operating tests. In this figure, units also appearing in FIG. 1 have the same reference numbers.

In the practical case illustrated by FIG. 4, the transition equipment 15 (FIG. 1) applies the synchronization bytes and signalling bytes in serial form to a wire INFE of link 19 which connects this equipment to unit 23. A first clocking signal, whose frequency is equal to the byte bit rate, is carried by wire H64KE of this link 19, whilst a second clocking signal whose frequency is equal to the byte rate is carried out by wire H8KE of this same link.

A shift register 50, whose data input is connected to wire INFE via a switch 52 and whose shift input is connected to wire H64KE via a switch 54, provides serial-to-parallel conversion such that the byte to be recorded in memory 25 appears on its parallel outputs, the address for indicating the memory location at which this byte is to be stored being supplied by a counter 56.

This counter 56 is cleared by a resetting signal obtained from a decoder 58. The inputs of this decoder are connected to the first four parallel outputs of register 50 such that when the synchronization half-byte is contained in this register, the resetting signal appears. The count input of counter 56 is connected to wire H8KE via a switch 60. At each change of contents, counter 56 produces on wire 57 a write pulse which is applied to one of the two inputs of a device 62. This device, whose other input is connected to a wire 27L of the scan wires 27, prevents conflicts from arising when a write pulse appears at the same time as a read pulse obtained from unit 9 (FIG. 1) on wire 27L.

This device 62 thus places memory 25 either in the read mode or in the write mode and applies to the memory addressing inputs by means of a code switch 64 the code indicating the memory location at which the read or write operation is to be performed.

The synchronization and signalling bytes to be transmitted on junction 13 towards the distant exchange 11 appear in serial form on wire INFS of link 21. This wire INFS is connected via a switch 66 to the serial output of a shift register 68. The parallel inputs of this shift register are fed with the data obtained from memory 29.

A counter 70 produces the addresses for reading the contents of memory 29. This counter 70 increments on the pulses generated by a divide-by-8 circuit 71, whose input in connected to the output of switch 54. As in the case of memory 25, a device 72 is provided to avoid conflict due to the simultaneous presence of read and write orders. This device 72 is identical with device 62, and its output is connected to the read/write order input of memory 29 via an AND gate 73 whose other input is fed with the output signal of switch 35, and also to the control input of switch 74 whose first inputs are fed with the code produced by the counter 70. One input of the device 72 is fed with a signal obtained from the counter 70, indicating that the contents of this counter have changed, while the other input is fed with a signal transmitted by wire 31E, indicating that unit 9 wishes to write a byte to memory 29 in the location indicated by the code present on wires 31A.

The decoding system 33 consists of an OR gate 76, whose four inputs are connected to four wires of 31D where the half-byte "0000" characterizing the synchronization byte is likely to appear. A logical "1" is obtained on the output of this gate for all codes present on these wires except for the particular configuration "0000." The NAND gate 78 forming part of the decoding system 33 possesses four inputs which are connected to the wires 31A. It produces a logical "1" only if the code present on wires 31A is "0000." An enable signal equal to "1" is thus obtained on the output of an AND gate 80 constituting the output 34 of the system 33 only if both conditions described above are satisfied, i.e. the simultaneous presence on the first four wires 31D of a code other than "0000" and the code "0000" on wires 31A. As already mentioned, this signal inhibits writing into memory 29 but on the other hand causes the byte available on wires 31D to be written into register 37.

It is proposed for the practical application of the invention to perform two kinds of closed-loop tests. The first test consists of producing a completely closed signalling loop, while the second involves a partial loop, i.e., only a particular signalling byte always occupying the same position in the multiframe is transmitted directly to the reception memory.

This type of test is defined by the first half-byte of the additional date byte produced by decoder 33. A decoder 82, whose inputs are connected to the first four parallel outputs of register 37, produces two signals on wires FTST3 and TST. A logical "1" on wire TST and a logical "0" on wire FTST3 indicate that a loop is to be established for the byte whose location is defined by the second half-byte of the additional data byte located in register 37. While a logical "1" on wire FTST3 indicates that all the bytes are to be looped, on a third wire FTST3 indicates that all the bytes are to be looped. On a third wire FTST1 can appear a signal which, when applied to an auxiliary register 84, loads the latter with the data obtained from the memory 29. The parallel outputs of register 84 are connected to the parallel inputs of a shift register 85. These registers 84 and 85 are used for transmitting during a loop operation a duplicate replacement byte to the central telephone exchange instead of the byte to be looped. The load input of register 85, in the same manner as that of register 68, is connected to the output of divider 71.

The byte stored in register 84 is obtained from a memory location indicated by the address contained in register 37. This code is transmitted to second inputs of switch 74 via another switch 86 whose other inputs are fed with the code transmitted over wires 31A.

As soon as an enable signal appears on output 34, it is thus no longer possible to record any data into memory 29. On the other hand, a read operation is possible. The enable signal applied to switch 86 places the latter in the state such that the address contained in register 37 is fed to memory 29. This has no effect unless an active signal appears on wire FTST1, when the byte on the output of memory 29 is loaded into register 84.

It is seen that the replacement byte to be transmitted in the case of a loop operation is initially stored in memory 29 at a given location indicated by an address code. This address is then transmitted over wires 31D and is accompanied by the code causing an active signal to appear on wire FTST1. This results in the replacement byte being located into register 84.

In order to perform these loop operations, a loop device 86A is provided, comprising the switches 52, 54, 60 and 66 already mentioned. In addition, it comprises a first shift register 87 whose serial input in connected to the serial output of register 68. The shift signal input is connected to the output of an AND gate 88, one input of which is connected to the output of switch 54 and the other to the output of an OR gate 90. A buffer register 92 is inserted between the parallel outputs of register 87 and the parallel inputs of a shift register 94. The transfer control wires of registers 92 and 94 are connected to the output of the divider 71 and to that of another divider 95 respectively. The latter is reset by a signal appearing on the output of switch 60.

The shift signal input of register 94 is connected to the output of an AND gate 96, one input of which is connected to the output of switch 54 and the other to the output of an OR gate 97. One input of switch 54 is connected to wire H64KE, while the other is connected to the output of a clock 98, whose pulses have the same frequency as those appearing on wire H64KE. The output of switch 54 is connected to the input of a divide-by-8 circuit 71, such that the signal on its output has the same frequency as that of the signal transmitted over wire H8KE.

When it is required to loop all the signalling bytes, a logical "1" appears on wire FTST3 connected to one input of each of the two OR gates 90 and 97. The logical "1" appearing on the output of these two gates 90 and 97 is applied to the control wires of switches 66 and 52, such that the serial input of register 50 is connected to the serial output of register 68 via registers 87, 92 and 94 and switch 52.

In addition, the signal present on wire FTST3 is applied to the control wires of switches 54 and 60, such that the signals carried by wires H64KE and H8KE are replaced by the output signals of clock 98 and the divider 71. The control unit can then compare the bytes transmitted and received at its level.

When it is required to loop a given byte, its address is first loaded into the last four bits of register 37. The signal on wire TST is a logical "1" while that on wire FTST3 is a logical "0," as already stated. The signal on wire TST opens two AND gates 102 and 104. The outputs of these gates are connected to one of the inputs of each of the OR gates 90 and 97. The other inputs of gates 102 and 104 are connected to the outputs of comparators 106 and 108 respectively.

When the contents of counter 70 correspond to the byte to be looped, this byte is stored in register 68. Since gate 88 is opened by the signal on the output of gate 90, the shift signals are applied to register 87, such that the byte is contained in this register 87. By means of the transfer signals produced by the divider 95, whose output is connected to register 94, and by means of the divider 71, whose output is connected to register 92, the byte finishes in register 94. If a loop is register 92, the byte finishes in register 94. If a loop is established, the data contained in register 85 appear on wire INFS.

The shift signals are applied to register 94 only when a relationship between the contents of counter 56 and the contents of the last four stages of register 37 is detected by means of the comparator 108. The logical "1" indicating this relationship is fed to one input of gate 96 via gates 104 and 97. The contents of register 94 are thus dumped and are found in register 50.

Although the principles of the present invention are described above in relation with specific practical examples, it should be clearly understood that the description is given as an example only and does not limit the scope of the invention.

What is claimed is:

1. A telephone exchange signalling unit adapted to constitute an interface interconnected between a pulse code modulated signal junction and a telephone exchange control unit which signalling unit is capable of receiving, comparing, and exchanging signalling and synchronization data in the form of binary multiplet arrays between said control unit and said pulse code modulated signalling junction wherein said signalling unit comprises a reception memory capable of receiving and storing signals from said junction, wherein the output of said reception memory is connected to the input of the control unit and is capable of making said data signals available to said control unit, the output of said control unit is connected to the input of a transmission memory and said signals are capable of being transferred from said control unit to said transmission memory; a decoder is attached between said control unit and said transmission memory which is capable of intercepting certain pulse code data signals having predetermined characteristics thereby preventing the introduction of said certain data signals to the transmission memory and making said intercepted data signals available instead at a register for further manipulation in a looping feedback circuit, which circuit is capable of comparing such intercepted data with the data received from said pulse code modulated signal junction; means are further provided for subsequently returning the intercepted data signals to said pulse code modulated signal junction from said signalling unit.

2. A signalling unit in accordance with claim 1 wherein a first part of the register is capable of storing a data multiplet which identifies a test signal, while a second part of the register is assigned to a signal relating to the multiplet data to be tested.

3. A signalling unit in accordance with claim 2 wherein a second decoding system is provided, whose input is received from the output of the first part of said register and the output of which second decoding system is capable of generating a complete loop order signal.

4. A signalling unit in accordance with claim 3 wherein said second decoding system is capable of producing a signal on its output ordering the looping of data multiplet determined by the second part of the contents of the said register.

5. A signalling unit in accordance with claim 4 wherein the output of said second decoding system is capable of ordering data transfer between the transmission memory and an auxiliary transmission register said auxiliary transmission register containing a duplicate data multiplet to be transmitted to the junction in place of the multiplets transmitted to the feedback circuit.

6. A telephone exchange signalling unit possessing a control unit and intended for exchanging signalling data obtained from a pulse code modulated signal junction, known as a PCM junction, and appearing in the form of multiplets arranged in frames and which are identified by a location code for defining their position with respect to a synchronization multiplet, and possessing a reception memory for storing the signalling multiplets obtained from the PCM junction and making them available on the scan wires to the control unit, said control unit being capable of transmitting signalling multiplets and location codes for said multiplets on distinct distribution wires; and a transmission memory for storing the signalling multiplets applied to the distribution wires by the control unit to allow their transmission on the PCM junction, and looping means for comparing the transmission memory storage data to the reception memory storage data, characterized by the fact that in order to receive additional data multiplets from the control unit, the signalling unit possesses a first decoding system whose first inputs are connected to the distribution wires for transmitting the signalling multiplets and whose second inputs are connected to distribution wires for transmitting locations, and which produces on its output an additional data enabling signal for a location code representing the location of the synchronization multiplet and for a multiplet different from the synchronization multiplet.

7. A signalling unit in accordance with claim 6, characterized by the fact that it possesses a register intended for storing the additional data multiplet and whose load input is activated by the output of the decoding system when the transmission memory possesses a data record inhibit control signal from the output of the decoding system.

* * * * *